Figure 1:
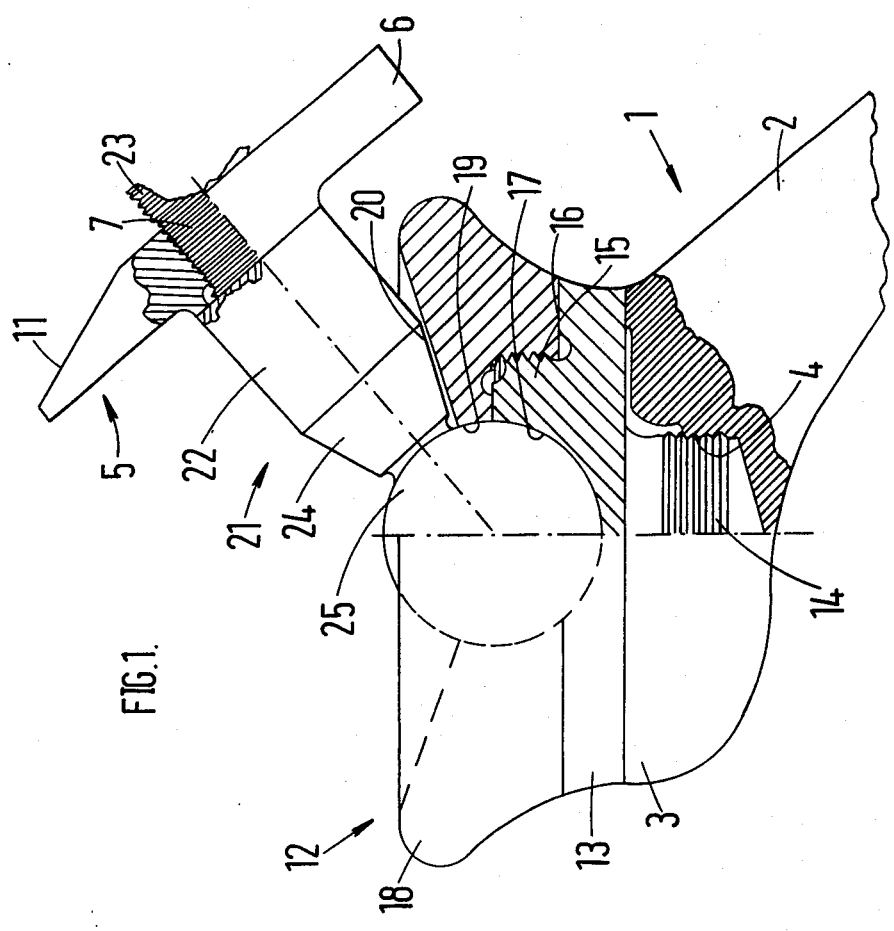

United States Patent [19]
Skorecki et al.

[11] 3,815,157
[45] June 11, 1974

[54] PROSTHETIC SHOULDER JOINT DEVICES

[75] Inventors: Jan Skorecki, Bramhall; Victor Henry Wheble, Stockport, both of England

[73] Assignee: National Research Development Company, London, England

[22] Filed: Nov. 22, 1972

[21] Appl. No.: 308,787

[30] Foreign Application Priority Data
Nov. 30, 1971  Great Britain............... 55438/71

[52] U.S. Cl. ..................................... 3/1, 128/92 C
[51] Int. Cl. ............................................ A61f 1/24
[58] Field of Search..... 3/1; 128/92 C, 92 CA, 92 R

[56] References Cited
UNITED STATES PATENTS

| | | | |
|---|---|---|---|
| 3,584,318 | 6/1971 | Scales et al. | 3/1 |
| 3,683,421 | 8/1972 | Martinie | 3/1 |
| 3,694,820 | 10/1972 | Scales et al. | 3/1 |

FOREIGN PATENTS OR APPLICATIONS

| | | | |
|---|---|---|---|
| 1,047,640 | 7/1953 | France | 128/92 C |

Primary Examiner—Richard A. Gaudet
Assistant Examiner—Ronald L. Frinks
Attorney, Agent, or Firm—Cushman, Darby & Cushman

[57] ABSTRACT

An endoprosthetic shoulder joint device has ball and socket components held in captive bearing engagement and demountably connectable with scapular and humeral fixation components. This facilitates use in that the fixation components can be secured first and then subsequently interconnected by a pre-assembled bearing assembly. The bearing assembly of ball and socket components can itself be demountable, and these components can be interchangeably connected with the two fixation components.

6 Claims, 4 Drawing Figures

PATENTED JUN 11 1974 3,815,157

PROSTHETIC SHOULDER JOINT DEVICES

This invention concerns endoprosthetic shoulder joint devices and it is intended to permit complete replacement of shoulder joints affected by disease or injury.

The provision of a total endoprosthesis will of course involve both a humeral head component and scapular glenoid component, and is associated with difficulty.

A first factor of difficulty arises from the consideration that any tendency for dislocation following humeral head replacement will be at least equally evident with total joint replacement if, as is the case with hip joints, the glenoid cavity is replaced by a similar cup-form prosthetic component. Indeed, since the total replacement device will involve at least two components, it may be expected that more muscle or other natural material will need to be removed for access to the implantation site compared to the situation for a partial replacement involving a single component, so increasing the likelihood of subsequent dislocation. The alternative, or possibly additional, expectation is that access will be very difficult.

A second factor of difficulty concerns fixation of the glenoid component since, although considerable success has been achieved in fixation of lower limb joint prostheses, particularly for the hip, the latter involve compressive joint loadings while the loading of the former will often be tensile. This factor is amplified by the fact that fixation in the relevant region of the scapula will need to be made in a very small amount of bone compared with other situations.

An object of the present invention is to reduce these difficulties and, to this end, provides an endoprosthetic shoulder joint device comprising first and second fixation components adapted for respective fixation to the scapula and the humerus, and a ball component and associated socket component adapted for respective demountable connection with said fixation components, said ball and socket components being arranged in, or adapted for, mutual bearing engagement with part of said ball component held captively in said socket component.

In such a device, the captive engagement of the ball and socket obviates any tendency to dislocation. Also, the demountable connection between the ball and socket on the one hand, and the fixation components on the other hand, can be of such a form that the latter components can be fixed with their respective bones first and the former components connected thereto subsequently as a pre-assembled unit. This reduces the difficulties in access to the implantation site.

Figure 2:
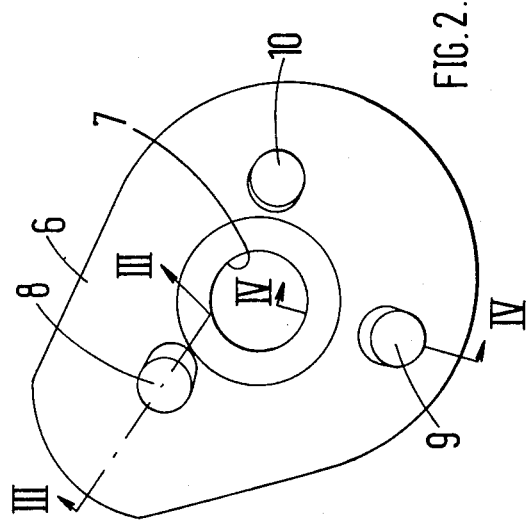
Figure 3:
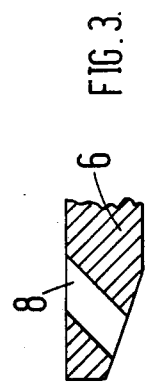
Figure 4:
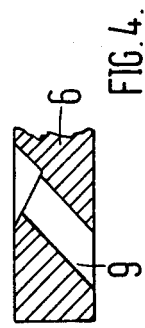

In order that the invention may be more clearly understood the same will now be further described, by way of example, with reference to the accompanying drawings, in which:

FIG. 1 illustrates one embodiment of a device according to the invention in partly-sectioned side elevation, FIG. 2 illustrates one component of FIG. 1 in top plan view, and FIGS. 3 and 4 are respective part-sectional views taken at III—III and IV—IV in FIG. 2.

The illustrated embodiment includes a humeral fixation component 1 in the form of a tapered intramedullary stem 2 generally similar to those used for existing humeral head prostheses, terminating at its wider end not in a ball head, but in a platform 3 having a threaded bore 4 formed in its upper surface. The stem 2 has a rounded-corner square cross-sectional shaping.

The scapular fixation component is denoted at 5 and includes a platform member 6 having a threaded bore 7 and plain bores 8, 9 and 10, the latter being shown in FIGS. 2 to 4. The platform member 6 is of generally ovoid plate form having its narrower end chamfered at 11 on the upper-most surface as seen in FIG. 1. From FIG. 2 it will be seen that, unlike the bore 7, the bores 8, 9 and 10 are inclined along directions other than perpendicular to the plane of the platform member, and these inclinations are skewed and mutually divergent outwardly from the assembled embodiment. FIGS. 2, 3 and 4 show that this inclination is most pronounced for bore 8, less so for bore 9, and least for bore 10 which is only slightly inclined relative to bore 7.

The socket component is denoted at 12 and includes two sub-components. The latter comprise a main socket member in the form of a plate 13 having a threaded boss 14 extending centrally from one side and an annular well 15 extending centrally from the other side. The well 15 is of narrower radial dimensions than the plate 13 so that the latter provides a radially outer shoulder 16. The radially outer side wall of the well is threaded, and the inner wall of the well is formed as a hemispherical bearing surface 17. The second sub-component is a collar 18 having its radially inner wall threaded partway therethrough from one end at a greater radius than the remainder of such wall which is in the form of a concave spherical-sectorally-shaped bearing surface 19. The axial end wall 20 of the collar adjacent the surface 19 is concavely inclined towards this surface in a conical manner.

It will be seen from FIG. 1 that the socket component 12 is demountably connectable with the humeral fixation component 1 by screwing the boss 14 of the latter into the bore 4 of the former and that, when so connected, their mutually adjacent outer surfaces are smoothly continuous.

The socket sub-components are similarly demountably connected by screwing the collar 18 around the well 15 until the shoulder 16 is engaged to provide a smoothly continuous outer surface, while the bearing surfaces 17 and 19 then represent neighbouring parts of a common sphere.

The ball component is denoted at 21 and includes a shaft 22 which is reduced in diameter and threaded at one end 23, and tapered in conical manner at its other end 24 where it is integrally connected with a spherically-shaped ball head 25.

Again, as will be seen from FIG. 1, the ball component 21 is demountably connectable with the scapular fixation component 5 by screwing the end 23 of the former into the bore 7 of the latter until the components engage with smoothly continuous outer surfaces. Captive engagement of the ball head 25 in the socket component 12 is afforded by passing the collar 18 around the shaft 22 before connecting the collar with its associated main socket component and, of course, before connecting the shaft with the scapular fixation means 5. It will be appreciated that the ball head 25 is of substantially the same radius as its associated socket surface 17, 19 to give mutual bearing surface engagement in similar manner to other joint prostheses involving ball-and-socket forms. Also, it will be noted that the range of articulation is enhanced by the conical shaping of the collar end wall 20 and the tapered shaft end 24. These shapings are chosen to give rise to line contact rather than point contact at any position of mutual engagement, thereby providing a firm stop action to define the limits of relative movement. In practice this requires that the conical shapings each have an apex coincident with the spherical centre of the respectively associated bearing surface area, these centres themselves being coincident in the assembled device.

In use of the illustrated embodiment the fixation components are secured to the scapula and humerus, and the ball and socket components are connected first with each other and then as a pre-assembled unit with the secured fixation components. This last step is made possible by the pivotal and rotational capabilities of the pre-assembled unit, together with the fact that the fixation components and the bones to which they are secured can be adequately separated during operation.

Securement of the humeral fixation means is effected by sectioning and excavating the humerus and its medullary canal in appropriate manner to receive the stem 2 and the under-side of the platform 3, and by use of a suitable acrylic cement or equivalent gap-filling medium. Securement of the scapular fixation component, however, involves the use of three screws (not shown) or equivalent intracancellous members applied, after suitable sectioning of the scapular glenoid region to receive the platform 5, through the respective bores 8, 9 and 10 into the scapula. More particularly, the sectioning is effected to locate these bores for passage of the associated screws respectively towards the root of the acromion process, towards the root of the coracoid process, and alongside the margin of the scapula. The resultant skewed and mutually divergent array of screws provides securement against rotation and outward extraction. This securement can be enhanced by dimensioning the shaft end 23 to project through and beyond the platform 11, and boring the scapular glenoid cavity to receive the projecting shaft end in acrylic cement. Such added securement also serves to reduce any tendency for the shaft to rotate in its fixation member after implantation. Some suitable measure, such as use of a sprung wedge (not shown), can also be taken to reduce any tendency for the socket member to rotate relative to the humeral fixation component platform 3 following implantation of the prosthesis.

Also, the shaft 22 may be provided with 'flats', and the collar 18 with stopped bores leading into its outer annular face, to facilitate gripping the same when assembling the prothesis during implantation.

Lastly regarding the illustrated embodiment: it is preferably of all-metal construction and the present more particular preference is for a chrome/cobalt alloy such as "VITALLIUM" or "VINERTIA," or a nickel/chrome alloy such as "INCONEL 625".

While the invention has been more particularly described with reference to the illustrated embodiment, variations thereof are possible without departing from the invention as expressed more generally in the appendant claims. For example, it is not essential that the ball and socket components be respectively connected with the scapular and humeral fixation components since these connections can be interchanged. Indeed, it may be preferred that a prosthesis according to the invention permits such interchangeability while presenting smooth outer surfaces at the inter-component connections in both of the possible configurations. Also, it is not essential that the ball component be captively held in the socket component by an arrangement which is demountable, but this is preferred since it offers the possibility of part replacement of only one of these components rather than complete replacement of a pre-assembled unit. Lastly, other modes of fixation can be used. Thus, while it is presently preferred to employ screw securement for the scapular fixation component, it may prove possible to use a component having an integral intracancellous stem in the place of one screw and, in some circumstances, two such replacements may be possible.

We claim:

1. An endoprosthetic shoulder joint device comprising:
    a scapular fixation component;
    a humeras fixation component;
    a ball component in the form of a shaft demountably connected at one end with one of said fixation components, terminating at its other end in a spherically shaped ball part, and conically tapered at said other end convergently towards said ball part;
    a socket component including a base part demountably connected with the other of said fixation components, and formed, remotely from such connection, with a hemispherically-shaped first concave bearing surface area of like radius with and located in mutual engagement with said ball part;
    and said socket component further including an annular collar part demountably connected with said base part, formed with a radially innermost spherically-sectorally-shaped second concave bearing surface area of like radius with and located in mutual bearing engagement with said ball part as a sector of a common sphere with said first concave bearing surface area, and being concavely conically inclined towards the rim of said second concave bearing surface area;
    said ball component conical tapering and said socket component collar part conical inclination each having an apex coincident with the spherical centre of the bearing engagement between said ball and socket components.

2. A device according to claim 1 wherein each of said demountable connections is of nut-and-bolt form.

3. A device according to claim 1 wherein said components are formed to provide smooth contiguous outermost surface portions at each of said demountable connections.

4. A device according to claim 1 wherein said ball and socket components are respectively demountably connected with said scapular and humeral fixation components.

5. An endoprosthetic shoulder joint device comprising:
    a scapular fixation component in the form of an ovoid-shaped plate having three elongated intracancellous fixation members projecting from a common face thereof in a mutually divergent manner;
    a humeral fixation component including an elongated tapered intramedullary stem;
    a ball component demountably connected with one of said fixation components;
    a socket component demountably connected with the other of said fixation components;

and said ball and socket components being interconnected with part of the former held captive in the latter in mutual bearing engagement.

6. An endoprosthetic shoulder joint device comprising:
   a scapular fixation component;
   a humeral fixation component;
   a ball component demountably connected with one of said fixation components;
   and a socket component demountably connected with the other of said fixation components;
   said ball and socket components being interconnected with part of the former held captive in the latter in mutual bearing engagement;
   and said demountable connections being of like form to permit interchange therebetween.

* * * * *